United States Patent [19]

Krueger et al.

[11] Patent Number: 4,580,081

[45] Date of Patent: Apr. 1, 1986

[54] COMPUTER CONTROLLED MOTOR VEHICLE BATTERY CIRCUIT

[75] Inventors: William R. Krueger, West Allis, Wis.; Gerald N. McAuliffe, Lincoln, Nebr.; George A. Schlageter, Mequon, Wis.

[73] Assignee: Outboard Marine Corporation, Waukegan, Ill.

[21] Appl. No.: 648,145

[22] Filed: Sep. 7, 1984

[51] Int. Cl.[4] .......................... H02P 1/10; H02J 7/36
[52] U.S. Cl. ................................. 318/139; 318/442; 307/10 R; 307/50
[58] Field of Search ............... 318/139, 442, 440, 549; 307/10 R, 48, 50, 54; 364/424, 425, 431.09

[56] References Cited

U.S. PATENT DOCUMENTS

| | | | |
|---|---|---|---|
| 3,387,194 | 6/1968 | Banks | 318/139 |
| 4,093,896 | 6/1978 | McAuliffe | 318/45 |
| 4,131,833 | 12/1978 | McAuliffe et al. | 318/440 |
| 4,283,668 | 8/1981 | Cavil | 318/139 X |
| 4,363,999 | 12/1982 | Preikschat | 318/53 |

FOREIGN PATENT DOCUMENTS 2018533 10/1979 United Kingdom ............... 318/139

Primary Examiner—Bernard Roskoski
Assistant Examiner—Bentsu Ro
Attorney, Agent, or Firm—Michael, Best & Friedrich

[57] ABSTRACT

A motor vehicle powered by a DC motor has a pedal which is depressed by the driver to increase speed by actuating a tapping switch which has two sets of moving contacts cooperating with stationary contacts to progressively connect with the motor batteries from one or the other end of a bank of series connected batteries. An alternate action relay connected between said motor and the switch determines which of the two sets is connected in circuit with the motor. The relay has two positions to alternately connect one or the other of the tapping switch contact sets in circuit with said motor. A main solenoid switch is connected in series with the relay and the tapping switch. When the pedal is depressed, a foot switch operated by the pedal is operative to close a circuit enabling energization of the alternate action relay and the main solenoid switch. A microprocessor controls operation of the relay and the main solenoid. When the pedal is released, the foot switch opens the enabling circuit and provides a signal to the microprocessor to restart the microprocessor program. The program including a register which is incremented with each passage of the logic responds to the incremented count in the register to energize the relay on alternate counts.

17 Claims, 4 Drawing Figures

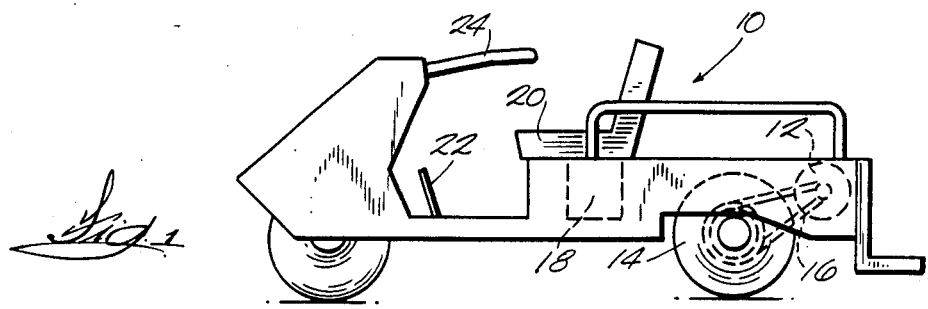
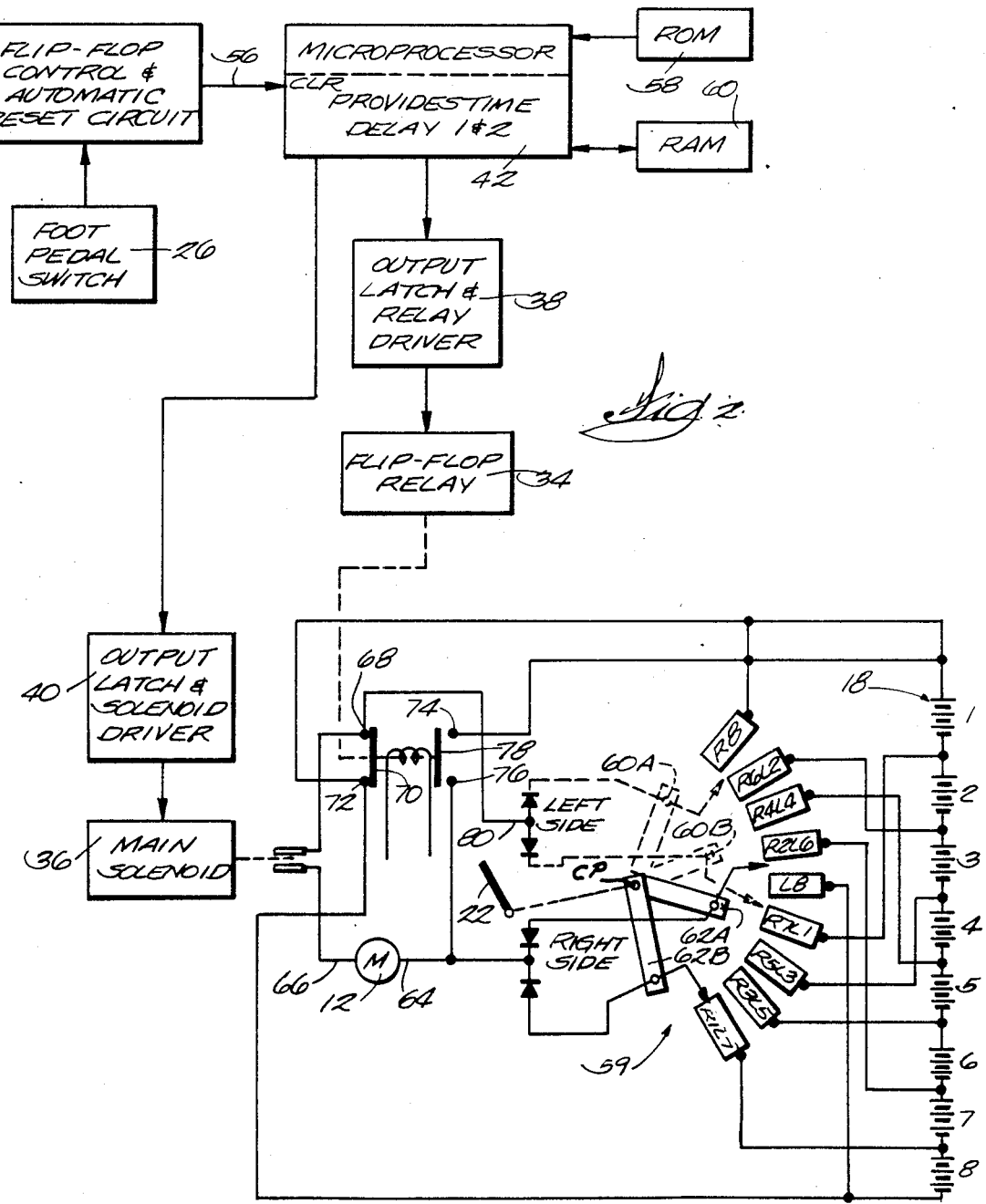

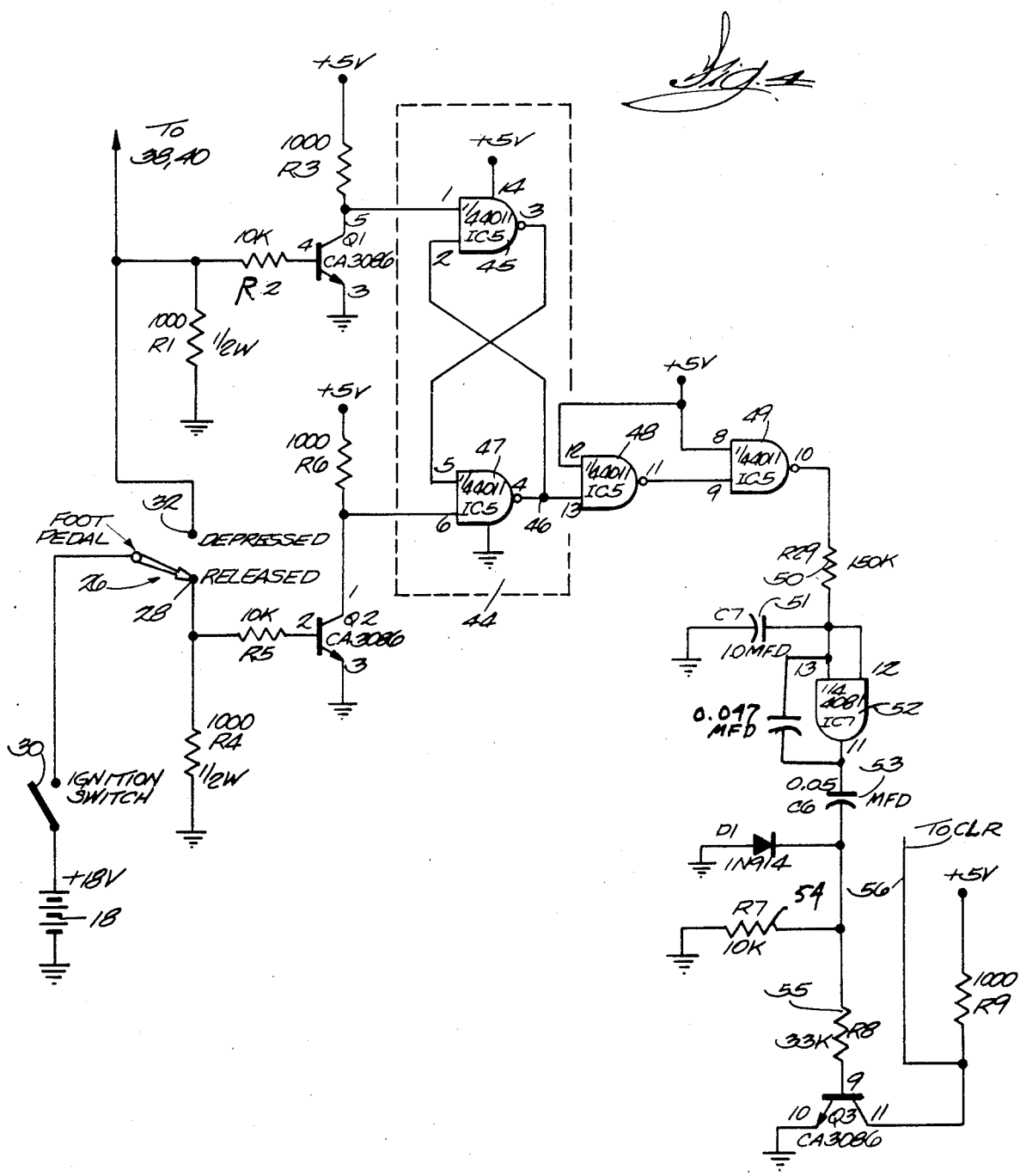

COMPUTER CONTROLLED MOTOR VEHICLE BATTERY CIRCUIT

BACKGROUND OF THE INVENTION

Electric vehicles have a DC motor powered by a bank of batteries. Motor speed is increased by placing additional batteries in the motor circuit. It is desireable to connect the batteries to the motor so the energy drawn for the individual batteries is about the same. Various means have been employed to achieve the desired sequencing of the battery connections. The present invention utilizes the capabilities of a microprocessor to control a flip-flop (alternate action or sequencing) solenoid.

"False" sequencing of the solenoid can occur when the foot pedal (accelerator) is released suddenly causing the associated switch to bounce. This previously required a damper on the switch which added cost.

An inherent defect in the prior art lies in the fact that the motor current flows through the main solenoid and the flip-flop solenoid. For cost reasons, the flip-flop solenoid is not as robust as the main solenoid. Therefore, the flip-flop can be damaged if required to switch heavy DC current. The flip-flop "drops out" (opens) in a longer time than the main solenoid so it is inherently protected on opening. But, there is nothing in the art assuring closing the main solenoid after the flip-flop.

Attention is directed to the following patents:

| Pat. No. | Issue Date |
| --- | --- |
| United States | |
| 4,093,896 | June 6, 1978 |
| 4,131,833 | Dec. 26, 1978 |
| 4,283,668 | Aug. 11, 1981 |
| Canadian | |
| 1,131,299 | Sept. 7, 1982 |

SUMMARY OF THE INVENTION

A feature of this invention is to provide a motor vehicle having a DC motor powered by a bank of series connected batteries. A foot pedal depressed by the driver to increase speed operates a tapping switch which has two sets of moving contacts cooperating with stationary contacts to progressively connect batteries from one or the other end of the battery bank in series with the motor depending on which of the two sets is connected in circuit with the motor. An alternate action relay connected between the motor and the switch has two positions to alternately connect one or the other of the contact sets in circuit with the motor. A foot switch operated by the foot pedal is operative when the pedal is depressed to close a circuit enabling energization of the alternate action relay and a microprocessor controls operation of the relay. The foot switch is operative when released to open the enabling circuit and provides a signal to return the microprocessor program to a starting point. The program includes a register which is incremented with each passage of the logic and the program instructs a change in position of said alternate action relay on alternate changes in the register.

Another feature provides for such a vehicle means responsive to movement of the pedal to its released position to cause said program to restart.

Another feature is that such means includes a flip-flop circuit having the input to each of its gates regulated by the foot switch to provide an output signal when the pedal moves to its released position. The output signal is applied to the microprocessor to restart the program.

Still another feature is to include a time delay means in the circuit between the flip-flop circuit and the microprocessor. This suppresses problems caused by "noise" in the power supply.

Still another feature is to provide such a time delay which at least partially utilizes available digital circuit.

Yet another feature is to provide any of the foregoing with a program having a time delay between starting the program and energizing the alternate action relay to avoid false response caused by foot switch bounce upon release of said pedal.

The foregoing structure includes a main solenoid switch connected in series with the relay and the tapping switch and controlled by the microprocessor. A feature is to provide that the program establishes a time delay between actuation of the alternate action relay and closure of the main solenoid switch so all power switching is done on the main switch.

This invention is not limited to the details of construction and the arrangement of components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

BRIEF DESCRIPTION OF THE DRAWINGS

FIG. 1 is a simplified showing of an electric vehicle of a general type on which the present invention would be used.

FIG. 2 is a greatly simplified showing of the relevant portion of the circuit incorporating the present invention. Many parts are simplified through use of blocks.

FIG. 4 is a detailed view of that portion of the circuit including the foot pedal switch and the flip-flop control and automatic reset circuit appearing at the upper left-hand corner of the FIG. 2 diagram.

DETAILED DESCRIPTION OF THE DRAWINGS

Figure 3:
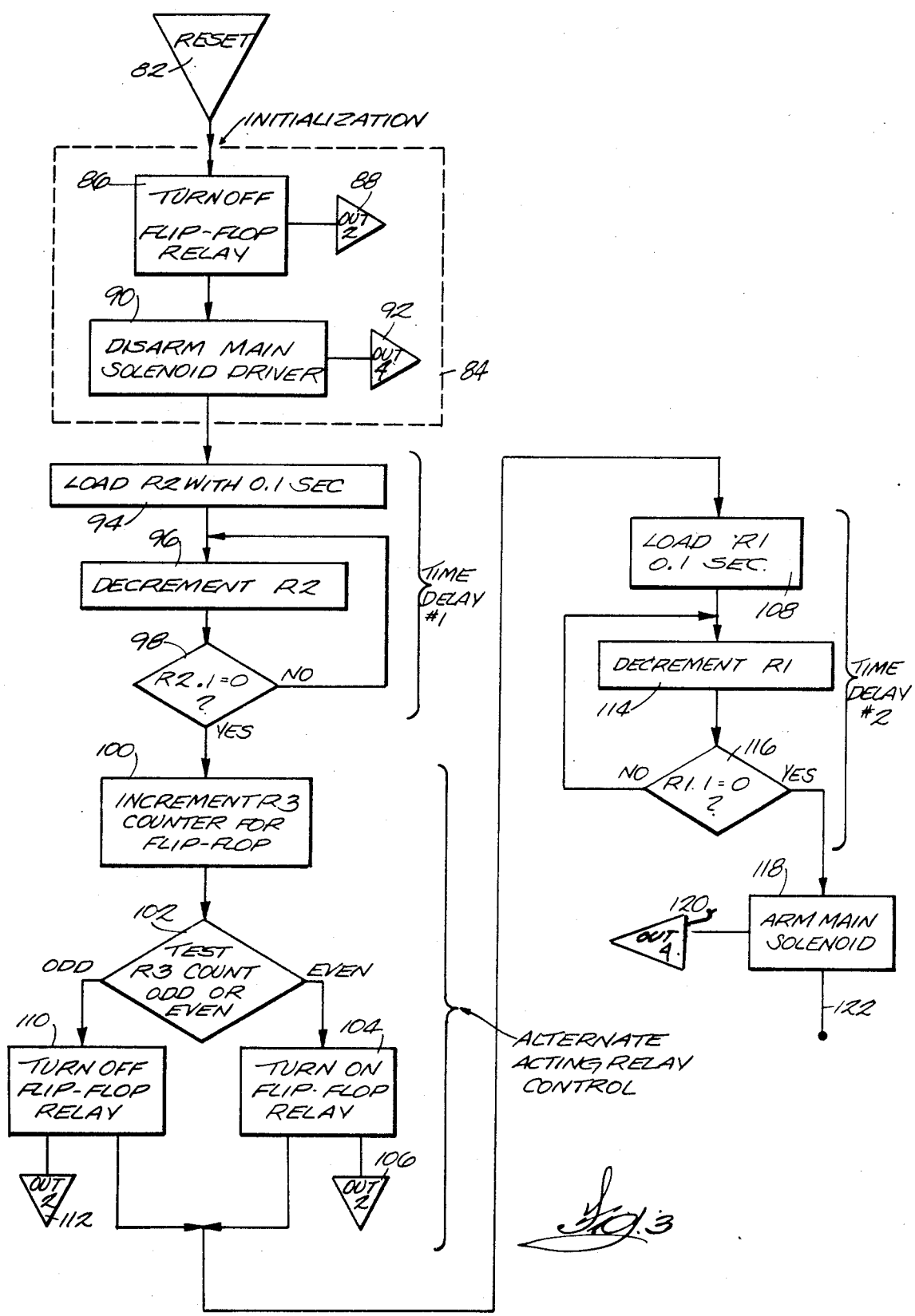
FIG. 3 is a greatly simplified flow chart for the microprocessor program.

The electric vehicle 10 shown in FIG. 1 has a DC motor 12 driving the rear wheels 14 through belt 16. The DC motor is powered by eight batteries in a pack designated 18 in this figure. There are eight (6 V storage) batteries in the bank and they are numbered 1 through 8 in FIG. 2. The driver sits on seat 20 and controls the speed by depressing the foot pedal 22 while steering with the tiller 24. The accelerator or foot pedal 22 has a switch 26 connected thereto to be actuated when the foot pedal is depressed. The pedal is biased to a released position in which the associated foot switch 26 connects the battery 18 (FIGS. 1, 2 and 4) to the contact 28 through the ignition switch 30. When the foot pedal is depressed, the foot switch 26 engages contact 32 to now supply 18 volts to driver (actuator) 38 for sequential (flip-flop) solenoid 34 and to driver 40 for the main solenoid 36 to enable energization of both solenoids in response to a signal from the microprocessor 42.

When the pedal is depressed, the foot switch closes on contact 32 and a signal is provided to transistor Q1 to energize the NAND gate 45 of the flip-flop circuit 44 to reset the flip-flop output 46 to 0. When the foot pedal is released the switch 26 closes on contact 28 to turn on the transistor Q2 causing NAND 47 to set the output 46 to 1. This output is then processed through NAND gates 48, 49 and then through the time delay and filter provided by resistor 50 and capacitor 51, through AND gate 52 and additional filtering provided by capacitor 53 and the resistors 54, 55 in the supply to the base of transistor Q3. When transistor Q3 conducts, a signal goes to the $\overline{CLR}$ input of the microprocessor 42 to cause the program associated with the microprocessor to reset. Thus, every time the foot pedal is released the microprocessor program is reset to the start of the program.

The signal to clear or reset the program is slightly delayed so the circuit to the flip-flop relay and to the main relay is opened before the program reset occurs. This was found to be desireable to avoid interference with the program by reason of the "noisy" 18 volt supply to the relays adversely affecting the computer program through the $\overline{CLR}$ or reset signal. The flip-flop circuit 44 and the time delay (48–55) and filtration network serves to filter out the noisy 18 volt input and provide a clean 5 volt signal at the output 56 of Q3, which is applied to the $\overline{CLR}$ pin in the microprocessor. The value of capacitor 51 is selected to give a significant time delay.

This arrangement of the foot switch resets the microprocessor when power is turned on and every time the foot pedal is fully released from a depressed position. This is important from the standpoint of battery balancing, as will be explained more fully hereinafter. It is also important from the standpoint of cleaning up "noise" in the system. Sometimes "noise" gets into the circuit and can cause an abnormal operating condition which is not necessarily noticeable to the driver of the vehicle. With random releasing of the foot pedal under normal driving conditions, the noise will most likely be eliminated by resetting the program. If the abnormal condition is servere enough to be noticed by the driver, an almost automatic reaction is to let up on the foot pedal and this will cause the system to reset and that will clear up the noise problem.

Virtually the entire content of FIG. 4 appears in those portions of FIG. 2 designated 26 (foot pedal switch) and in the box labeled "flip-flop control and automatic reset circuit", the output of which is applied via 56 to the $\overline{CLR}$ input on the microprocessor 42. The computer program is stored in a read-only memory (ROM) connected to the microprocessor. The random access memory (RAM) 60 connected to the microprocessor provides temporary data storage. This RAM is actually also connected to the ROM. The RAM and ROM provide the computer logic and control of the hardware.

Until the foot pedal 22 is depressed, neither the main solenoid nor the flip-flop can be energized, even though the ignition switch 30 is closed. A tapping switch 59 is connected to and actuated by the foot pedal 22 (see FIG. 2). The tapping switch includes one set of movable contacts 60a, 60b, shown in dashed lines, which rotate about a center fixed pivot point CP in a clockwise direction as the foot pedal is depressed. Another set of movable contacts 62a, 62b shown in solid lines, rotates simultaneously about CP but in a counterclockwise direction.

FIG. 2 shows the position of the battery tapping switch contacts as they would be with the foot pedal just slightly depressed. The flip-flop relay is shown engaging the contacts 68 and 72 and this causes contact 62b (on the "right side" of the tapping switch) to engage fixed contact R1L7 which is connected to battery 8 which is now placed in circuit with the motor 12, i.e., the positive side of battery 8 connects through R1L7 and 62b to motor terminal 64. The other side 66 of the motor is connected to relay contact 68, across the shorting bar 70 of the flip-flop to contact 72 and then to the negative side of battery 8.

If the flip-flop relay is moved to the right in FIG. 2, the movable contact 60b (on the "left side" of the tapping switch) engages fixed contact R7L1 which connects to the negative side of battery 1. The positive side of battery 1 is connected to the relay contact 74 which is connected to contact 76 through the shorting bar 78. Thus, the positive side of the battery is connected to motor terminal 64 while the other terminal 66 is connected via contact 68 and line 80 through the input between the diodes on the "left side" of the movable switch assembly. No connection is made on the other side of the tapping switch.

The usual reversing switch for the motor has not been shown. The alternate action (flip-flop) solenoid or relay acts to connect the motor to the left side or the right side of the tapping switch to thereby determine whether batteries will be added to the circuit in sequence from the battery No. 1 end of the battery bank or from the battery No. 8 end of the bank.

As the foot pedal is depreesed slightly more, new connections are made so two batteries are now connected to the motor, either the Nos. 1 and 2 or Nos. 7 and 8. Further foot pedal depression results in continuing series of new connections being made (to a maximum of 8 batteries) with more batteries being connected to the motor from alternate ends of the battery pack, depending on the condition of the flip-flop relay. It will be appreciated that by alternately starting the connections from the No. 1 or No. 8 ends of the pack 18, the energy drain on the individual batteries is equalized as much as reasonably possible.

The control of the flip-flop relay is important, both from the standpoint of the alternate connections at the right side and left side of the tapping switch 59, but also to insure proper sequencing of the flip-flop relay relative to the main solenoid. For cost reasons, it is desireable that the main solenoid do all the power switching, that is, with electric power on the contacts. For example, when the contact is to be made, it is desireable to first energize the flip-flop relay and then energize the main solenoid. When opening the circuit (when the foot pedal is released) the main solenoid 50 opens faster than the flip-flop relay due to the nature of the relay. Therefore, there is no need to be concerned with sequencing on opening. The main will open first and break the "live" contacts.

The microprocessor controls the time delay to insure proper sequencing of the relays on closing. Tne computer program or logic is set forth in a very simplified manner in FIG. 3. Further programs can appear at the end of FIG. 3. The additional program could be used in conjunction with functions not of concern in the present invention.

As noted above, when starting or if the foot pedal is released, a signal is applied to the microprocessor 42 via 56 to input $\overline{CLR}$ to reset or clear the program. The first thing that happens at the reset 82 (FIG. 3) is that the control and the parts are initialized at 84. Initializing means placing the various registers and components in a starting or initial condition so that the program can deal with a known situation. As part of the initialization, the logic proceeds to a processing box 86 which directs that the flip-flop relay be turned off. Thus, the output 88 is a signal to turn off the flip-flop relay. The next processing box 90 signals at 92 to disarm or turn off the main solenoid driver. When the pedal is depressed, the foot switch closes and supplies power to the solenoids. Subsequent opening of the foot switch take power off the two relays and signals the microprocessor to reset. There are other causes, not relevant here, for reseting the program. Therefore, if any other such cause has operated to cause the program to reset, the two relays will be disarmed as noted.

The next stage in the program (FIG. 3) is to load a register R2 (in the microprocessor 42) with a 0.1 sec. time delay at process box 94. Then the logic proceeds to box 96 where the R2 register is decremented. Then the logic goes to decision box 98 to determine whether the register R2.1 equals 0. If it does not equal 0, the time delay hasn't been used up and the logic goes back (via the "no" branch) to start through box 96 once again to again decrement the time delay register R2. When it is determined the R2.1 register has been reduced to 0, the program exits decision box 98 via the "yes" branch and proceeds to processing box 100 where register R3 in the microprocessor is incremented one count and the program proceeds to the decision box 102 which tests to determine if the R3 register count is now odd or even (1 or 0). If the R3 count is even, the program exits on the "even" branch to process box 104 to send a signal 106 to turn on the flip-flop relay and the program proceeds to box 108. If, on the other hand, the count in R3 is odd, the decision box would exit the program on the "odd" branch to process box 110 to send out a signal at 112 to turn off the flip-flop relay (that can be a redundant signal in view of the signal 88 from 86) and the logic proceeds to process box 108.

At box 108, register R1 in the microprocessor is loaded with a 0.1 sec. time delay. The program then proceeds to process stage 114 where the R1 register is decremented and the logic then goes to the decision box 116 which asks whether the R1.1 register has been reduced to 0. If it has not, the program exits on the "no" branch and returns for another pass through the process box 114. If R1.1 has been reduced to 0, then the program exits on the "yes" branch to process box 118 which sends a signal 120 to arm the main solenoid while the logic exits via 122 to go on to other program functions not relevant here.

As may be seen in FIG. 3, the first time delay (time delay No. 1) is established at process box 94. This insures a time delay between closing the foot switch and energizing the flip-flop relay driver 38. This delay must be used up before the program can pass from decision box 98 to process box 100. At 100 the count register (in the microprocessor) for the flip-flop relay is incremented and the program proceeds to decision 102 to release the program via the "odd" or "even" branch depending on the R3 count register (odd or even) to control the energization of the flip-flop relay.

The time delay established at 94 prevents fooling the control if the foot switch bounces when the pedal is released. By programming the time delay in the microprocessor bouncing the foot switch will have no effect. The delay prevents a false flip or flop of the flip-flop relay due to a pedal bounce.

The second time delay (time delay No. 2) established at decision box 108 insures a 0.1 sec. delay between energizing the flip-flop relay (at 104 or 110) and energizing the main solenoid to close the main contacts. Thus, the main solenoid does the power switching on closing since it has to wait 0.1 sec. after the flip-flop has been actuated.

We claim:

1. A motor vehicle having a DC motor, a pedal biased to a released position and depressed by the driver to increase speed, a bank of series connected batteries, a tapping switch actuated by said pedal and having two sets of moving contacts cooperating with stationary contacts to progressively connect batteries from one or the other end of said bank in series with said motor depending on which of the two sets is connected with said motor, an alternate action relay connected between said motor and said switch and having two positions to alternately connect one or the other of said contact sets with said motor, a foot switch operated by said pedal and operative when said pedal is depressed to close a circuit enabling energization of said alternate action relay, and a microprocessor including a program for controlling operation of said alternate action relay, said foot switch being operative when said pedal is released to open said enabling circuit, said program including a register which is incremented with each passage of the logic and being responsive to the incremented count in said register to instruct a change in position of said alternate action relay.

2. A vehicle according to claim 1 including means responsive to movement of said pedal to said released position to cause said program to restart.

3. A vehicle according to claim 2 in which said responsive means includes a flip-flop circuit having the input to each of its gates regulated by said foot switch to provide an output signal when said pedal moves to said released position, said output signal being applied to said microprocessor to restart the program.

4. A vehicle according to claim 3 including time delay means in circuit between said flip-flop circuit and said microprocessor.

5. A vehicle according to claim 4 in which said program provides a time delay between starting the program and energizing said alternate action relay to avoid false response caused by foot switch bounce upon release of said pedal.

6. A vehicle according to claim 5 including a main solenoid switch connected in series with said alternate action relay and said tapping switch means and controlled by said microprocessor, said program providing a time delay between actuation of the alternate action relay and closure of said main solenoid switch.

7. A vehicle according to claim 6 in which said foot switch is connected to enable energization of said main solenoid switch when said pedal is depressed and to disable said main solenoid switch when said pedal is released.

8. A motor vehicle driven by a DC motor, a bank of series connected batteries, a foot pedal biased to a released position and depressed by the driver to increase vehicle speed, a tapping switch operated by said pedal and having two sets of moving contacts, one set being operative to progressively connect to said motor batteries from one end of said bank and the other set being operative to progressively connect to said motor batteries from the other end of said bank, an alternate action switching relay connected between said motor and said tapping switch and movable between first and second positions to connect said one set of contacts or said other set of contacts with said motor, computer means including a program register incremented with each passage of the logic to indicate whether said relay has been actuated an even or odd number of times, and a subsequent program step directing actuation of said relay on alternate passages of the logic as revealed in said register.

9. A vehicle according to claim 8 including a main switch connected in circuit between said motor and said alternate action relay, a solenoid operating said main switch, said computer means controlling energization of said solenoid, and a foot switch operated by said pedal, said solenoid being in circuit with said foot switch and being de-energized when said pedal is released.

10. A motor vehicle having a DC motor, a pedal depressed by the driver to increase speed, a bank of series connected batteries, a tapping switch actuated by said pedal and having two sets of moving contacts cooperating with stationary contacts to progressively connect batteries from one or the other end of said bank in series with said motor depending on which of the two sets is connected with said motor, an alternate action relay switch connected between said motor and said tapping switch and having two positions to alternately connect one or the other of said tapping switch contact sets in circuit with said motor, a foot switch operated by said pedal and operative when said pedal is depressed to close a circuit enabling energization of said relay switch, a microprocessor controlling operation of said relay switch, said foot switch being operative when said pedal is released to open said enabling circuit and to provide a signal to said microprocessor to return the microprocessor program to a starting point, said program including a register which is incremented with each passage of the logic, said program including means responsive to the content of said register to signal for a change in position of said relay switch on alternate depressions of said pedal.

11. A motor vehicle having a DC motor, a bank of series connected batteries, an electric circuit including said motor and said bank, a tapping switch in said circuit and having two sets of movable contacts, one of said sets being operative to progressively add batteries to said circuit from one end of said bank, the other of said sets being operative to progressively add batteries to said circuit from the other end of said bank, an alternate action relay switch in said circuit and having two positions, one of which connects said one set in the circuit and the other of which connects said other set in said circuit, a foot pedal biased to a released position and depressed by the driver to actuate said tapping switch, a computer which has a program starting point and has a count register which is incremented with each passage of the logic, said computer being operative to control said relay switch to move to one or the other of said relay switch positions in response to the incremented count in said register indicating an odd or even number of prior actuations of said switch relay, and means responsive to release of said pedal to restart said program.

12. A computer control according to claim 11 in which said means includes a foot switch operated by said pedal to enable operation of said relay switch when said pedal is depressed and to disable operation of said relay switch when said pedal is depressed.

13. A computer control according to claim 12 in which said computer includes time delay means to delay energization of said relay switch after said program is started.

14. A computer control according to claim 13 including a main switch in circuit with said motor and said relay switch, a solenoid for operating said main switch, said computer controlling energization of said solenoid when said pedal is depressed, said computer providing a time delay between energization of said relay switch and energization of said solenoid.

15. A computer control according to claim 14 in which said means responsive to pedal release to restart said program includes said foot switch and a flip-flop circuit connected between said foot switch and said computer to provide a signal to said computer to restart said program.

16. A computer control according to claim 15 including a time delay means connected between said flip-flop circuit and said computer to delay said signal.

17. A motor vehicle having a DC motor, a pedal biased to a released position and depressed by the driver to increase speed, alternate switching means affecting vehicle speed control, a foot switch operated by said pedal and operative when said pedal is depressed to close a circuit enabling energization of said alternate switching means, and a microprocessor including a program for controlling operation of said alternate switching means, said foot switch being operative when said pedal is released to open said enabling circuit, said program including a register which is incremented with each passage of the logic and being responsive to the incremented count in said register to instruct a change in position of said alternate switching means.

* * * * *